United States Patent
Smaldone et al.

(10) Patent No.: US 10,452,543 B1
(45) Date of Patent: Oct. 22, 2019

(54) USING PERSISTENT MEMORY TECHNOLOGY AS A HOST-SIDE STORAGE TIER FOR CLUSTERED/DISTRIBUTED FILE SYSTEMS, MANAGED BY STORAGE APPLIANCE

(71) Applicant: EMC IP Holding Company LLC, Hopkinton, MA (US)

(72) Inventors: Stephen Smaldone, Woodstock, CT (US); Ian Wigmore, Westborough, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 15/717,779

(22) Filed: Sep. 27, 2017

(51) Int. Cl.
  *G06F 13/00* (2006.01)
  *G06F 12/0804* (2016.01)
  *G06F 16/172* (2019.01)
  *G06F 16/182* (2019.01)

(52) U.S. Cl.
  CPC ........ *G06F 12/0804* (2013.01); *G06F 16/172* (2019.01); *G06F 16/182* (2019.01); *G06F 2212/1008* (2013.01); *G06F 2212/1041* (2013.01); *G06F 2212/154* (2013.01)

(58) Field of Classification Search
  CPC ....... G06F 2212/154; G06F 2212/1041; G06F 2212/1008; G06F 17/30194; G06F 17/30132; G06F 12/0804
  See application file for complete search history.

(56) References Cited

U.S. PATENT DOCUMENTS 5,522,058 A * 5/1996 Iwasa ................ G06F 12/0813
  711/121
2006/0143406 A1* 6/2006 Chrysos ............ G06F 12/0804
  711/143

* cited by examiner

*Primary Examiner* — Charles Rones
*Assistant Examiner* — Han V Doan
(74) *Attorney, Agent, or Firm* — Womble Bond Dickinson (US) LLP

(57) ABSTRACT

Embodiments are described for a multi-node file system, such as a clustered or distributed file system, with a file system buffer cache and an additional host-side tier non-volatile storage cache such as 3DXP storage. Cache coherency can be maintained by one of three models: (i) host-side tier management, (ii) file system management, or (iii) storage array management. performing a storage tier-specific file system action in a file system that comprises a namespace that spans multiple tiers of storage.

15 Claims, 11 Drawing Sheets

USING PERSISTENT MEMORY TECHNOLOGY AS A HOST-SIDE STORAGE TIER FOR CLUSTERED/DISTRIBUTED FILE SYSTEMS, MANAGED BY STORAGE APPLIANCE

TECHNICAL FIELD

This disclosure relates to the field of cache systems for clustered/distributed file systems.

BACKGROUND

A clustered file system is a file system which is shared by being simultaneously mounted on multiple servers or "nodes." Clustered file systems can provide features such as location-independent addressing and redundancy which improve reliability or reduce the complexity of other parts of the clustered file system. A distributed file system is similar to a clustered file system, but a distributed file system does not share block level access with other nodes of the file system. Both clustered and distributed file systems (collectively, and individually "clustered/distributed file systems", or "C/DFS") gain a performance benefit by caching reads and writes to physical storage units attached to nodes of the C/DFS. In any caching system, cache coherency must be maintained. Cache coherency ensures that a file system read operation always returns the most recent version of a file system object. Cache coherency also ensures that a write operation writes the most recent version of a file system object to storage. When a C/DFS node reads a cache, peer nodes in the C/DFS must be notified to ensure that they are accessing the most recent version of a file system object or object extent. When a C/DFS node writes to cache, peer nodes must be notified to invalidate older cached versions of file system objects.

Currently, caching is performed using volatile random access memory (VRAM). Read/write access to VRAM is fast, but VRAM is expensive in terms of cost. In a C/DFS system, the cost of cache is multiplied by the number of nodes in the C/DFS. Thus, a C/DFS must balance the cost of VRAM cache against the performance gain offered by caching storage reads and writes. In addition, volatile RAM cache is vulnerable to data loss due to power outages and unexpected, uncontrolled C/DFS node failures.

New, fast, non-volatile random access memory ("persistent cache") storage technologies, such as 3D Crosspoint (3DXP) are coming on the market that have similar read/write access times to VRAM and are less expensive than VRAM and have access times that are similar to VRAM. 3D Xpoint (3DXP) is a non-volatile memory technology by Intel® and Micron Technology®, that is a bit storage based on a change of bulk resistance, in conjunction with a stackable cross-gridded data access array. A C/DFS would benefit from the fast access time, non-volatility, and lower cost of these new storage technologies. A challenge with providing a persistent cache tier below a VRAM file buffer cache in a C/DFS is that the persistent cache does not participate in the C/DFS cache coherency protocol for the VRAM file buffer cache. When a peer node of a C/DFS receives cache invalidations for shared file system objects, the C/DFS will not know that the persistent cache may contain an invalid version of the file system object. Conversely, when a peer node of a C/DFS receives a request to flush writes from its VRAM file buffer cache to the C/DFS, the writes may be held in the persistent cache for some time afterwards, causing the peer nodes to believe that the most recent version of a file system object (or object extent) is persisted at a physical storage device in (e.g. at a storage array) when in fact the write is only contained with the persistent storage buffer visible to the node of the C/DFS that initiated the cache flush operation.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1A:
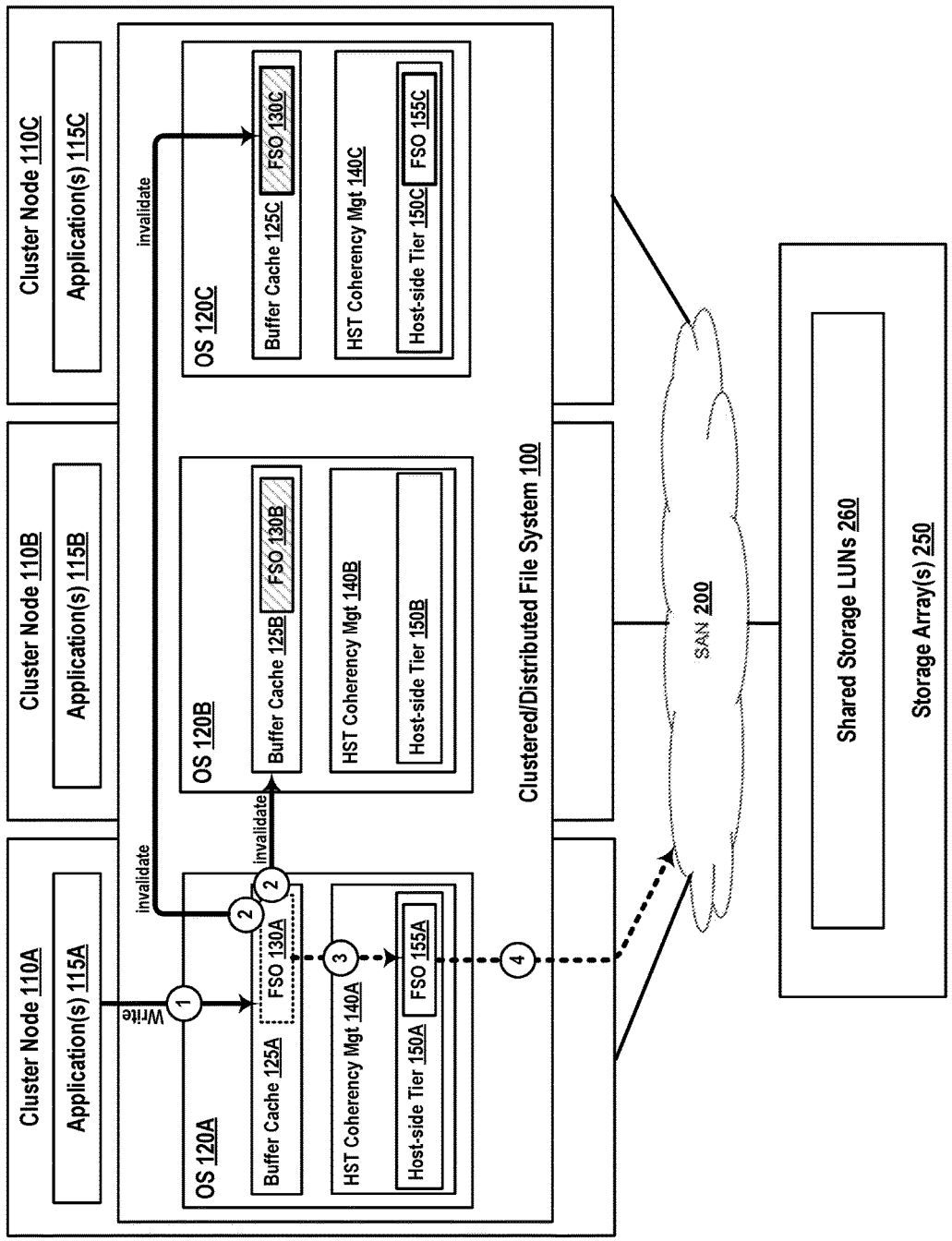
FIGS. 1A and 1B illustrate, in block diagram form, components and functionality of a clustered/distributed file system (C/DFS) wherein each node in the C/DFS has a file system buffer cache and a host-side cache with host-side cache coherency managed by a host-side cache coherency management system, independent from the file system buffer cache, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for managing a host-side tier cache of each node of a clustered/distributed file system (C/DFS). Each node in the file system can have both a file system buffer cache, which is typically a volatile random access memory (RAM), and a host-side tier cache, which can be a non-volatile high-speed memory. Three different embodiments are described for managing cache coherency in the nodes of the C/DFS: (i) a host-side tier managed embodiment, (ii) a file system managed embodiment, and (iii) a storage device managed embodiment. The described embodiments can be implemented as a "snoop" type, write-back cache coherency model, wherein nodes communicate with one another to manage coherency of the caches. Other cache coherency protocols can be implemented using the systems and methods described herein.

In a first embodiment, in response to receiving, by a host-cache on a first node of a multi-node file system (e.g. C/DFS), a copy of a file system object (FSO) from a file system buffer cache on the first node, the following operations can be performed. The FSO can be stored in a host-side cache of the first node in the multi-node file system. Host-side cache coherency logic can send a message to a second and a third node of the multi-node file system to invalidate a copy of the FSO in a host-side cache of each of the second and third nodes. A copy of the FSO from the host-side cache of the first node can be sent to a host-side cache of at least the second node of the multi-node file system, thereby updating the host-side cache of the second node to contain the most recent version of the FSO. The host-side cache of each of the first, second, and third nodes can comprises a non-volatile storage, distinct from the file system buffer cache, and distinct from a bulk storage device, such as a disk drive or storage array. Cache coherency logic of the host-side cache of the nodes in the multi-node file system can be independent of cache coherency logic of the file system buffer cache on each of the nodes in the multi-node file system. In an embodiment, sending of the copy of the FSO from the host-side cache of the first node to the host-side cache of the second node can be in response to a request from the second node. Flushing the received copy of the FSO from the host-side cache of the first node to a storage system can be in response to an event. In an embodiment, the event can be one of receipt message to the FSO from the host-side cache, the FSO has not been read for a predetermined period of time, storage available in the host-side cache of the first node is below a threshold minimum value, or receipt of a request to flush pending writes has been received from the storage system. In an embodiment, each of the first, second, and third nodes can include host-side cache coherency logic, and the host-side cache coherency logic of the first, second, and third nodes can communicate with each other to implement coherency logic for the combined first, second, and third node host-side caches.

In a second embodiment, in response to receiving, by a file system of a first node in a multi-node file system, a request to read a file system object (FSO), the following operations can be performed. A message can be sent to a file system of each of a plurality of other nodes in the multi-node file system, indicating an intent to read the FSO. The intent-to-read message sent to each file system of a plurality of other nodes in the multi-node file system can cause the file system of the node with the most recent version of the FSO to flush its copy of the FSO to a storage device. The file system of the first node can read the FSO from the storage device and store the FSO in a host-side cache of the first node. A copy of the FSO from the host-side cache of the first node, can be provided to fulfill the request. In an embodiment, the copy of the FSO from the host-side cache is provided via a file system buffer cache of the first node. In an embodiment, the host-side cache can comprise a non-volatile storage, distinct from the file system buffer cache and distinct from a bulk storage device such as a disk drive or storage array. In an embodiment, the operations can further include notifying the file system of each node in the plurality of nodes in the multi-node file system when the most recent version of the FSO has been flushed to the storage device. Operations can further include determining the node in the multi-node file system that has the most recent version of the FSO, and causing the determined node to flush the copy of the FSO from a file system buffer cache of the determined node to a host-side cache of the determined node. In an embodiment, operations can further include flushing the copy of the FSO in the determined node from the host-side cache of the determined node to the storage device. In an embodiment, the cache coherency logic in each node can manage both the file system buffer cache of the node and the host-side cache of the node.

In a third embodiment, the host-side cache buffer of each node of a plurality of nodes in a multi-node file system (e.g. C/DFS) can be managed by processing logic in a storage device of the multi-node file system, including the following operations. A storage device in a multi-node file system can receive an indication of a read request for a copy of a file system object (FSO) at a second node of the multi-node file system. The storage device can also receive an indication that a host-side cache of a first node within the multi-node file system contains the most recent version of the FSO as among a plurality of nodes of the multi-node file system. The storage device can instruct the host-side cache of the first node to write the FSO to the storage device. In an embodiment, the coherency of a host-side cache of each node in the multi-node file system can be managed by the storage device. In an embodiment, the host-side cache of each node in the multi-node file system is distinct from a file system buffer cache of each node of the multi-node file system. In an embodiment, operations can further include the storage device sending an invalidate FSO message to the each of the plurality of nodes of the multi-node file system, other than the first node. Operations can also include the storage device sending the copy of the FSO received from the host-side cache of the first node to the host-side cache of the second node. In an embodiment, in response to the storage device receiving a read request for the FSO from a third node, before receiving an indication of invalidation of the FSO, operations can further include instructing the host-side cache of the first node or the second node to move a copy of the FSO to the host-side cache of the third node.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, or other types of invocations or parameters via the API.

Figure 1B:
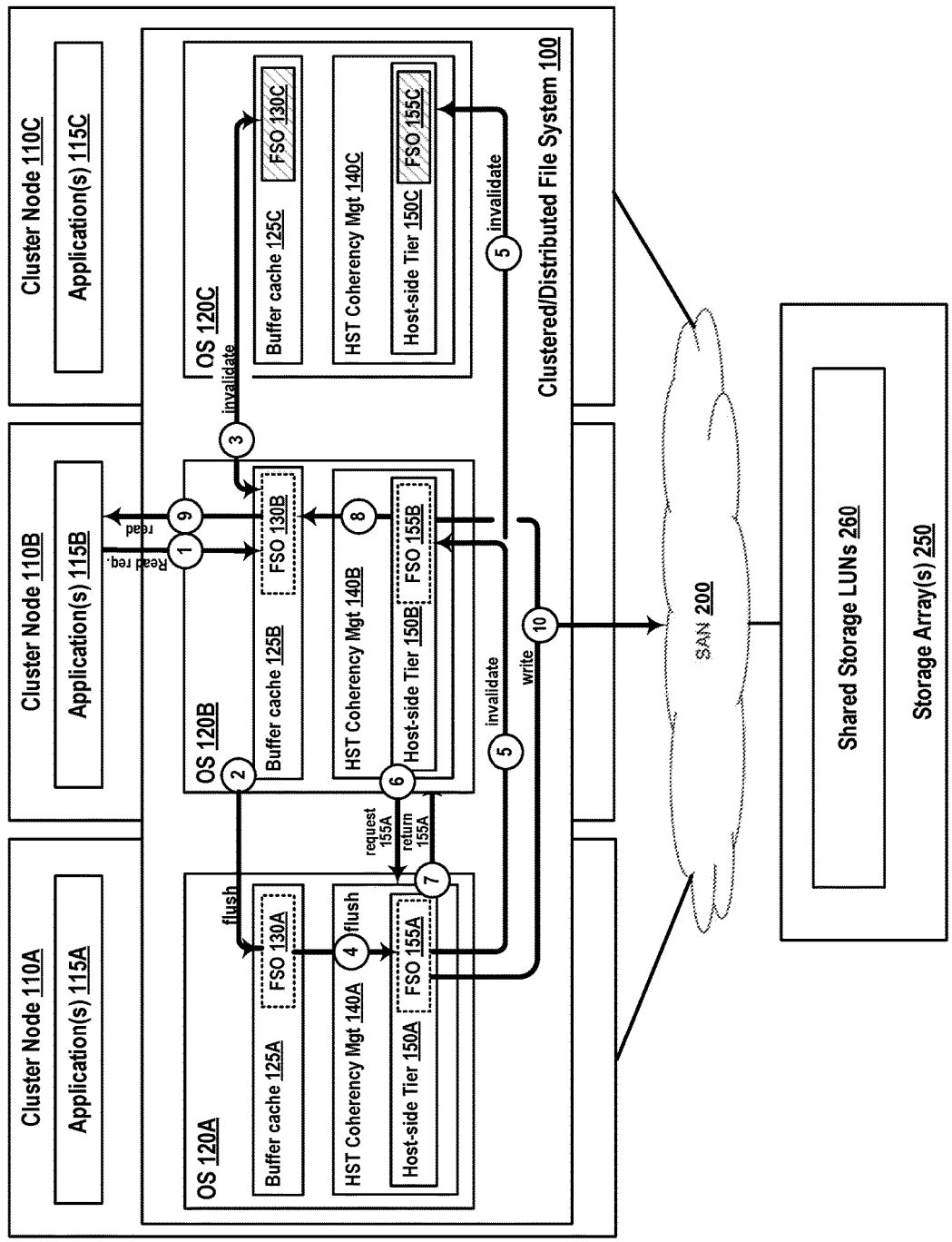

FIGS. 1A and 1B illustrate, in block diagram form, components and functionality of multi-node file system, such as a clustered/distributed file system (C/DFS) 100, wherein each node 110 in the C/DFS has a file system buffer cache 125 and a host-side cache 150 with host-side cache coherency managed by a host-side cache coherency management system, in accordance with some embodiments. Method 400, described below with reference to FIG. 4, describes a method ensuring cache coherency logic in accordance with FIGS. 1A and 1B.

In this embodiment, a host-side cache 150 and host-side cache coherency management layer is introduced that coordinates synchronization of writes and write invalidations within the host-side cache 150. The host-side cache 150 can operate independently from the clustered/distributed file system (C/DFS) 100 and a storage device 250, such as a storage array, coupled to the C/DFS 100. When a write is issued by a file system of a node 110 of C/DFS file system 100, the file system of the node 110 notifies peer file system nodes 110 to invalidate their local file system buffer caches 125. These writes will eventually be flushed from the node's file system buffer cache 125 to the node's host-side cache 150. At that time, coherency logic of the host-side cache 150 for the node 110, issues an invalidation message host-side caches 150 of peer nodes 110 in the C/DFS 100, so that they will invalidate any older versions of the same file system object (FSO) that may currently reside there. A read from any file system node 110 is an example action that can cause the host-side cache 150 of any other node 110 that currently holds an unwritten copy of the requested FSO in its file system buffer cache 125 to flush the copy of the FSO to the node's host-side cache 150. This flush causes invalidations, similar to the write case. Once flushed, the requesting node's 110 host-side cache 150 fetches a copy of the file system object from the peer node 110 that has the most recent copy of the file system object. In addition, file buffer cache 125 (e.g. 125A) can periodically flush (FIG. 1A, (3)) a most recent version of FSO 130 (e.g, FSO 130A) from buffer cache 125 (e.g., 125A). Although buffer cache 125 need not be aware of host-side 150, HST Coherency Mgt. 140 can detect flush messages from buffer cache 125, intended to flush to storage array 250, intercept those messages, and store the flushed FSO 130 to host-side cache 150 (e.g. 150A) as FSO 155. Host-side cache 150 can, in turn, periodically and independently from buffer cache 125, flush (FIG. 1A, (4)) a most recent version of FSO 155 (e.g. FSO 155A) to storage array 250. For purposes of continuing with the example that a flush from buffer cache 125 is initiated by a write (FIG. 1B, (1)) operation from application 115 (e.g. 115A), and for description of FIG. 1B, it is presumed that flush operation (FIG. 1B, (2)) from buffer cache 125 is in response to a read request (FIG. 1B, (1)).

A clustered/distributed file system (C/DFS) 100 can include a plurality of file system nodes, such as cluster nodes 110A, 110B, and 110C. In the following description, unless a specific node or element of a node is indicated, a cluster node and its elements are generically referenced without a subscript letter, e.g. cluster node 110, and elements of a cluster node, e.g. application(s) 115, operating system 120, file buffer cache 125, and host-side cache 160.

Each cluster node 110 can include one or more applications 115 and an operating system 120. In the embodiments described in FIGS. 1A and 1B, operating system (OS) 120 can include drivers, application programming interfaces (APIs) or other software that implements a file system, include a namespace for files, read/write functionality, mapping of file system data structures to one or more logical unit numbers (LUNs) of a storage device, interprocess and inter-node communications, file system buffer cache logic, including coherency logic. Operating system 120 can include cache coherency logic, implemented as hardware, software, and/or a combination thereof, to maintain coherency of the file system buffer cache 125, independently from host-side tier (HST) cache coherency management 140 for host-side cache 150 for each node. File system buffer cache 125 can be implemented as volatile random access memory (RAM). Host-side cache 150 can be implemented using high-speed non-volatile, persistent, memory that is distinct from storage array(s) 250. Host-side cache 150 can be implemented using, for example, 3D Xpoint (3DXP), a non-volatile memory technology by Intel® and Micron Technology®, that is a bit storage based on a change of bulk resistance, in conjunction with a stackable cross-gridded data access array. Host-side cache 150 can also be implemented using battery-backed RAM, flash memory, or other high-speed non-volatile memory, new or existing. Host-side cache 150 can comprise a write-back cache, supplemental to file system buffer cache 125. In an embodiment, cache coherency logic for file system buffer cache 125 and for HST coherency management 140 can be "snoop" type cache coherency protocol.

Operating system (OS) 120 can include communication capabilities such that each node 110A . . . 110C can communicate via one or more calls to communication services of OS 120A . . . OS 120C. Communication can be via a common bus or backplane, for nodes implemented inside a common server backplane. Inter-node 110 communication can be via high-speed network, such as network 200, shared memory, inter-process communication, or other communication methods. Network 200 can be any type of network including Ethernet, Wireless, USB, Fire-Wire, Token-Ring, fiber-optic, high-speed interconnecting bus, Fibre Channel, or other type of network. C/DFS 100 can further include one or more storage arrays 250, that expose a plurality of logical unit numbers (LUNs) of storage 260 to the nodes of C/DFS 100. A storage array can be, for example, an EMC® Data Domain® file system, or other storage appliance. A storage array can comprise a large plurality of storage units, such as disk drives, interconnected with a high-speed backplane or network, and can including processing logic, that may include one or more hardware processors, memory, network interfaces, display(s), and an operating system and drives to implement, e.g., the storage appliance in a Storage Area Network (SAN).

Operation of cache coherency for buffer cache 125 and host-side cache 150 is shown by way of example in FIGS. 1A and 1B. Referring to FIG. 1A, the example includes writing (1) of a file system object (FSO) 130A by application 115A to a node file system implemented by Operating System (OS) 120A. Multiple copies of the FSO 130 can exist within the C/DFS 100. For example, a read or write operation at node 110B can result in an existing copy of FSO 130B in buffer cache 125B and/or a copy of FSO 155B in host-side cache 150B. Similarly, a copy of FSO 130C and/or FSO 155C can exist in node 110C buffer cache 125B and/or host-side cache 150C, respectively. In response to write (1) by application 115A, coherency logic in OS 120A can cause buffer cache 125A to send (2) an "invalidate copy of FSO 130" message to nodes 110B and 110C. Invalidated copies of FSO 130B and 130C are shown with hashed lines in FIG. 1A.

Referring now to FIG. 1B, a read request (1) from Application(s) 115B for a copy of FSO 130, or other operation that requires a most recent copy of FSO 130, can be received by OS 120B at node 110B. Inter-node communication among nodes 110A-110C and buffer cache coherency logic of OS 120A-120C can determine that node 110A, buffer cache 125A, has the most recent copy of FSO 130 (FSO 130A). In response to receiving the read request (1), and the determination that buffer cache 125A has the most recent copy of FSO 130 (130A), buffer cache coherency logic of OS 120B can issue a "flush copy of FSO 130" message to peer node 110A. Also in response to the read request (1) of FIG. 1B, and since node 110C does not contain the most recent copy of FSO 130, buffer cache coherency logic of OS 120B can send an "invalidate copy of FSO 130 (FS 130C)" to node 110C to invalidate the copy FSO 130C in buffer cache 125C.

HST coherency mgt. 140A-140C for host-side caches 150A-150C can be aware of coherency logic communications for buffer caches 125A-125C. In response to the determination that node 110A buffer cache 125A has the most recent copy of FSO 130 (130A), HST Coherency Mgt 140A awareness of the flush (2) message sent from OS 120B to OS 120A, HST Coherency Mgt 140A can cause host-side cache 150A to receive FSO 130A and store FSO 130A in host-side cache 150A as FSO 155A. FSO 155A is the most recent copy of FSO 155, as between host-side caches 150A-150C in nodes 110A-110C, respectively.

In response to host-side cache 150A storing FSO 155A, HST Coherency Mgt. 140A for node 110A can send (5) an "invalidate copy of FSO 150" message to nodes 110B and 110C. At node 110B, HST Coherency Mgt. 140B thus marks FSO 150B as invalid, and at node 110C, HST Coherency Mgt. 140C marks FSO 150C as invalid.

To satisfy the read request (1) at node 110B, by, e.g., application 115B, HST Coherency Mgt. 140B can request (6) the most recent copy of FSO 155 (155A) from host-side cache 150A. In response, HST Coherency Mgt. 140A can send (7) host-side cache 150A copy of FSO 155A to host-side cache 150B. Thus, host-side cache 150B at node 110B now has a copy of the most recent copy of FSO 155 stored in host-side cache 150B as FSO 155B.

Buffer cache coherency logic in OS 120B of node 110B can be aware that host-side cache 150B now has a most recent copy of FSO 155 (155B) by virtue of awareness of communications for cache coherency between nodes of the C/DFS 100. Buffer cache 125B can read (8) FSO 155B from host-side cache 150B and store 150B in buffer cache 125B as FSO 130B. Similarly, OS 120B can read FSO 130B from buffer cache 125B and provide (9) FSO 130B to requesting application 115B, thereby satisfying the initial request (1) by application(s) 115B for a most recent copy of FSO 130.

After the above processing, host-side cache 150A of node 110A and host-side cache 150B of node 110B both hold a same, most recent copy of FSO 155. HST Coherency Mgt. 140A and 140B can coordinate to determine which copy of FSO 155 (155A or 155B) will be written-back (10) to storage array 250 as the most recent copy of FSO 130. Timing of the write-back of FSO 155A or FSO 155B to storage array 250 can be asynchronous with the above cache coherency logic, so long as FSO 155A or 155B has not been invalidated by subsequent cache coherency operations. HST Coherency Mgt. 140A-140C can also coordinate to the most recent version of a modified FSO 155 to storage array 250 independent from a read or write operation by, e.g. an application 115. This may occur, for example, during periods of low activity in order to avoid having to flush synchronously during the read request.

Figure 2A:
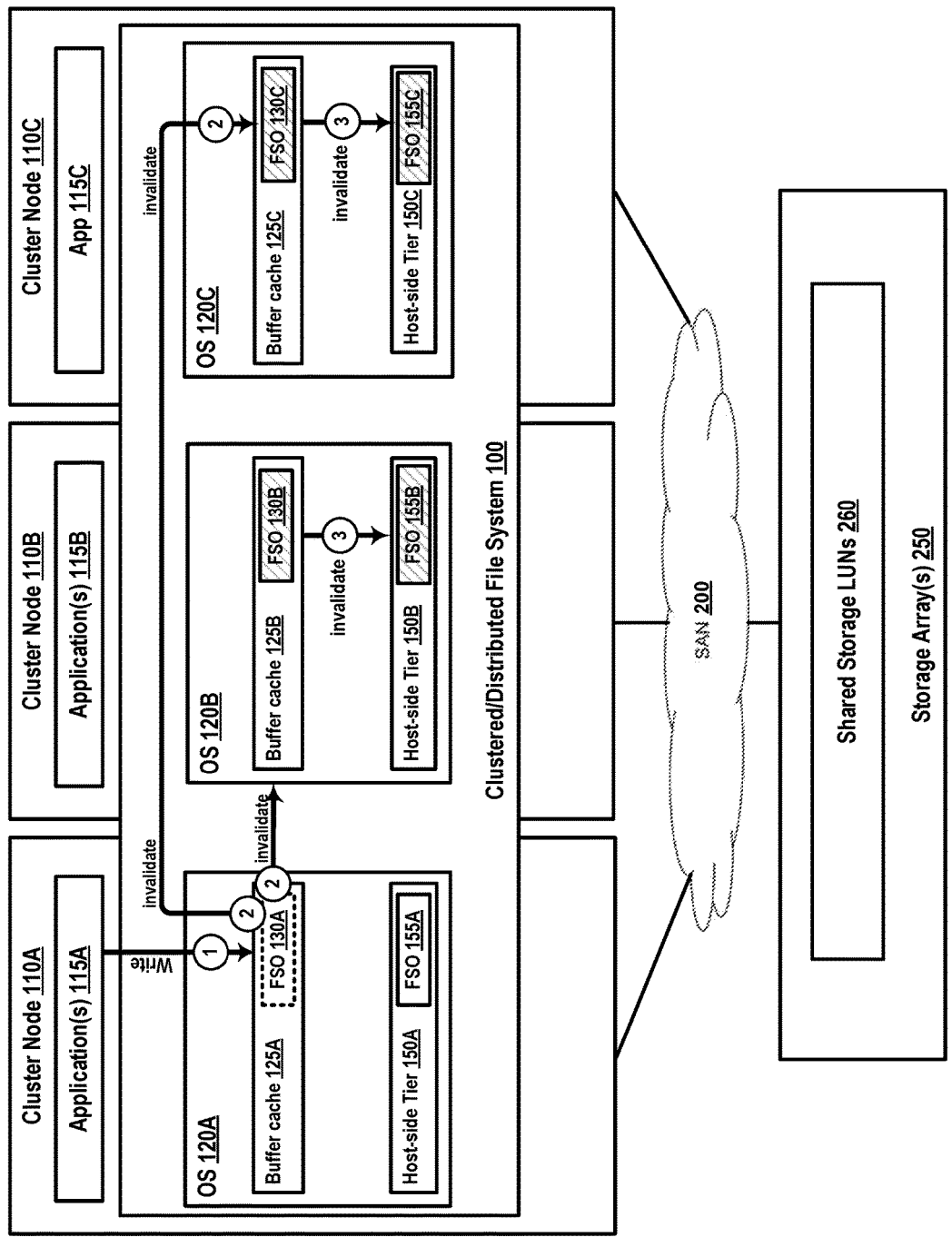
FIGS. 2A and 2B illustrate, in block diagram form, components and functionality of a clustered/distributed file system (C/DFS) wherein each node in the C/DFS has a file system buffer cache and a host-side cache with file system buffer cache coherency and host-side cache coherency managed by a file system management system, in accordance with some embodiments.
Figure 2B:
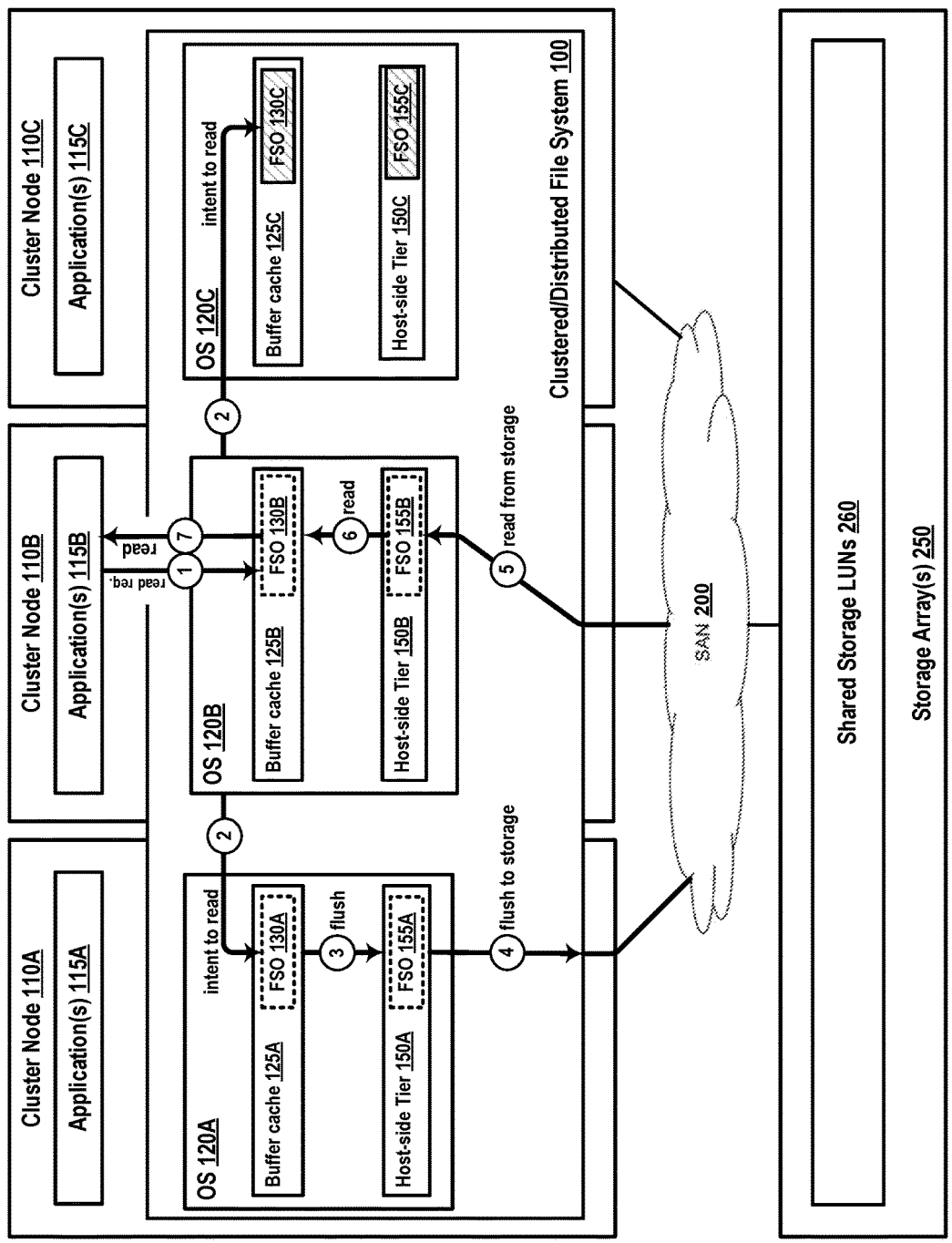

FIGS. 2A and 2B illustrate, in block diagram form, components and functionality of a clustered/distributed file system (C/DFS) 100 wherein each node 110 in the C/DFS 100 has a file system buffer cache 125 and a host-side cache 150 with file system buffer cache coherency and host-side cache coherency managed by a file system management system of a node 110, in accordance with some embodiments. Method 500, described below with reference to FIG. 5, describes a method having the cache coherency logic described below with reference to FIGS. 2A and 2B.

In the embodiment of FIGS. 2A and 2B, the Clustered/Distributed file system 100 cache coherency protocol is extended to include awareness of the host-side tier 150. This embodiment introduces a new messaging mechanism that includes a flush and an invalidation message originating from each node 110 of the multi-node file system 100 to the host-side cache 150 of each node 110 in the multi-node file system 100. When a write is issued by a node 110 of the multi-node file system 100, the node 110 first sends file system buffer cache 125 invalidation messages to other file system nodes 110. These messages may, in turn, issue invalidate messages to the local host-side cache 150 of each node 110, to invalidate any local copies of the file system object (FSO) being written by the write originating at a node 110. For a read operation, the file system node 110 that originates the read operation notifies the other nodes 110 of the multi-node file system 100 of the originating node's 110 intent to read the file system object. This causes the other file system nodes 110 to flush any pending writes to that same file system object from their respective file system buffer caches 125 to their respective host-side caches 150. Once each node 110 has flushed its copy of the FSO from file system buffer cache 125 to the host-side cache 150 of the node, the node's file system will issue the new flush message to the host-side cache 150 to flush the copy of the FSO that is in the host-side cache 150 of the node, to the storage array 250. Then the read operation continues on the originating node 110 and the FSO is read from the storage array 250 into the local host-side cache 150 of the originating node 110.

Cluster nodes 110A-110C and application(s) 115A-115C, buffer cache 125A-125C, and host-side cache 150A-150C have been described above with reference to FIGS. 1A and 1B. For brevity, these elements will not be described again here.

In the embodiment described with reference to FIGS. 2A and 2B, operating systems 120A-120C can include cache coherency logic that is aware of both the file system buffer cache 125 and the host-side buffer cache 150 of each node. Communication of cache coherency messages between OS 120A-120C can be shared internally on each node 110 to implement cache coherency for both file system buffer cache 125 and host-side cache 150 for cluster nodes 110A-110C.

Operation of cache coherency for buffer cache 125 and host-side cache 150 is shown by way of example in FIGS. 2A and 2B. Beginning with FIG. 2A, the example includes writing (1) of a file system object (FSO) 130A by application 115A. Multiple copies of the FSO 130 can exist within the C/DFS 100. For example, a read or write operation at node 110B can cause a copy of FSO 130B to exist in buffer cache 125B and/or a copy of FSO 155B to exist in host-side cache 150B. Similarly, a copy of FSO 130C and/or FSO 155C can exist in node 110C buffer cache 125B and/or host-side cache 150C, respectively.

In response to the write (1) by application 115A, cache coherency logic in OS 120A can cause buffer cache 125A to send (2) an "invalidate copy of FSO 130" message to nodes 110B and 110C. Cache coherency logic in OS 120B can invalidate copy of FSO 130 (FSO 130B) in cache 125B. Cache coherency logic in OS 120C can similarly invalidate a copy of FSO 130 (FSO 130C) in cache 125C. Invalidated copies of FSO 130B and 130C are shown with hashed lines in FIG. 2A. Cluster node 110B host-side cache 150B may already have a copy of FSO 130, stored as host-side cache FSO 155B. In response to OS 120B receiving (2) the "invalidate file buffer cache 125 copy of FSO" message from node 110A, file buffer cache coherency logic in OS 120B can send (3) an "invalidate copy of FSO 130 (referenced as 155B)" message to host-side cache 150B. Similarly, in response to OS 120C receiving (2) the "invalidate file buffer cache 125 copy of FSO" message from node 110A, file buffer cache coherency logic in OS 120C can send (3) an "invalidate copy of FSO 130 (referenced as 155C)" message to host-side cache 150C. FSO 155B and FSO 155C are invalidated, accordingly.

Continuing to FIG. 2B, a C/DFS 100 node, e.g. cluster node 110B, can generate a request (1) for a copy of FSO 130, such as from application 115B. Cache coherency logic in OS 120B of node 110B can send (2) an "intent to read a copy of FSO 130" message to each of nodes 110A and 110C. It can be seen from FIG. 2A, that buffer cache 125A previously received a write operation and therefore contains the most recent copy of FSO 130 (FSO 130A). It can also be seen from FIG. 2A that buffer cache 125C received an "invalidate copy of FSO 130" message. Thus, the copy of FSO 130 in buffer cache 125A is the most recent copy of FSO 130, and the copy of FSO 130 in buffer cache 125C is invalid. Accordingly, when OS 120A of node 110A receives the "intent to read a copy of FSO 130" message from OS 120B, the message (2) triggers an operation (3) at cluster node 110A to flush FSO 130A from buffer cache 125A to host-side cache 150A. No such action is triggered on node 110C, because the copy of FSO 130 at node 110C is invalid. The resulting copy of FSO 130A that is stored in host-side cache 150A is referenced as FSO 155A. Cache coherency logic in OS 120A can further (4) flush the FSO 155A to storage array(s) 250. In an embodiment, storage array(s) 250 can return a write acknowledgement to node 110A in response to flushing FSO 155A to storage array(s) 250. In an embodiment, cache coherency logic in OS 120A can then send a message to nodes 110B and 110C that FSO 155A (a most recent copy of FSO 130) confirming that the most recent version of FSO 130 (155A) has been written to storage array(s) 250 and the write has been acknowledged by the storage array(s) 250 as being complete.

Upon receiving the notification from node 110A that FSO 155A has been written to storage device 250, cache coherency logic in OS 120B can then cause host-side cache 150B to (5) read FSO 130 from the storage array 250 and store FSO 130 into host-side cache 150B. The FSO 130 read from storage is indicated as FSO 155B in host-side cache 150B of node 110B. Cache coherency logic in OS 120B can further read (6) FSO 155B from host-side cache 150B and store the FSO in buffer cache 125B as FSO 130B. Buffer cache 125B can then provide (7) FSO 130B to requesting application 115B as the most recent version of FSO 130. Cache coherency logic in OS 120A-OS 120C can also periodically initiate a "flush" message to a host-side cache 150A-150C for a modified FSO 155 independent from a read or write operation by, e.g. an application 115. This may occur, for example, during periods of low activity in order to avoid having to flush synchronously during the read request.

Figure 3A:
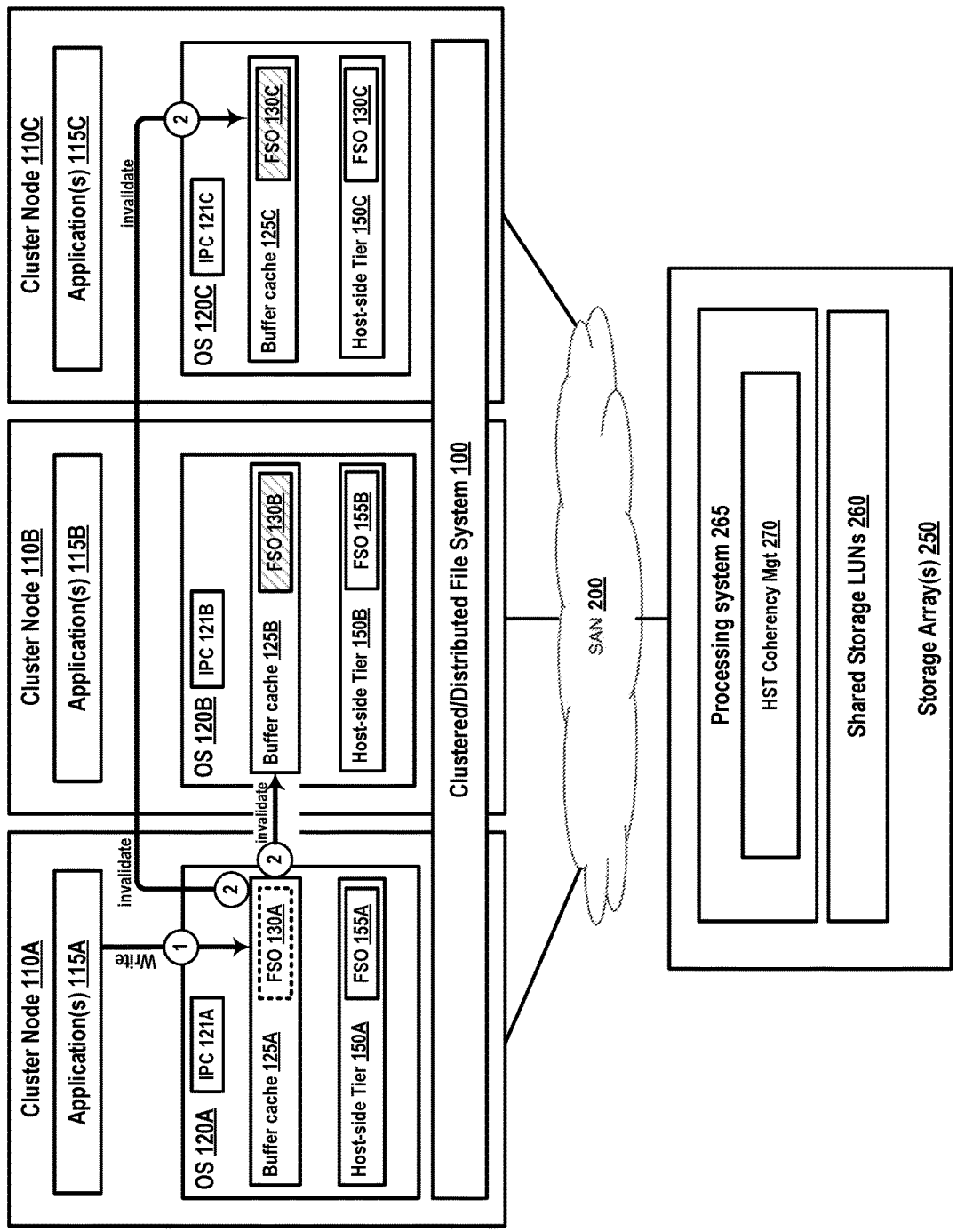
FIGS. 3A and 3B illustrate, in block diagram form, components and functionality of a clustered/distributed file system (C/DFS) wherein each node in the C/DFS has a file system buffer cache and a host-side cache with the host-side cache coherency managed by cache coherency logic in a storage device, in accordance with some embodiments.
Figure 3B:
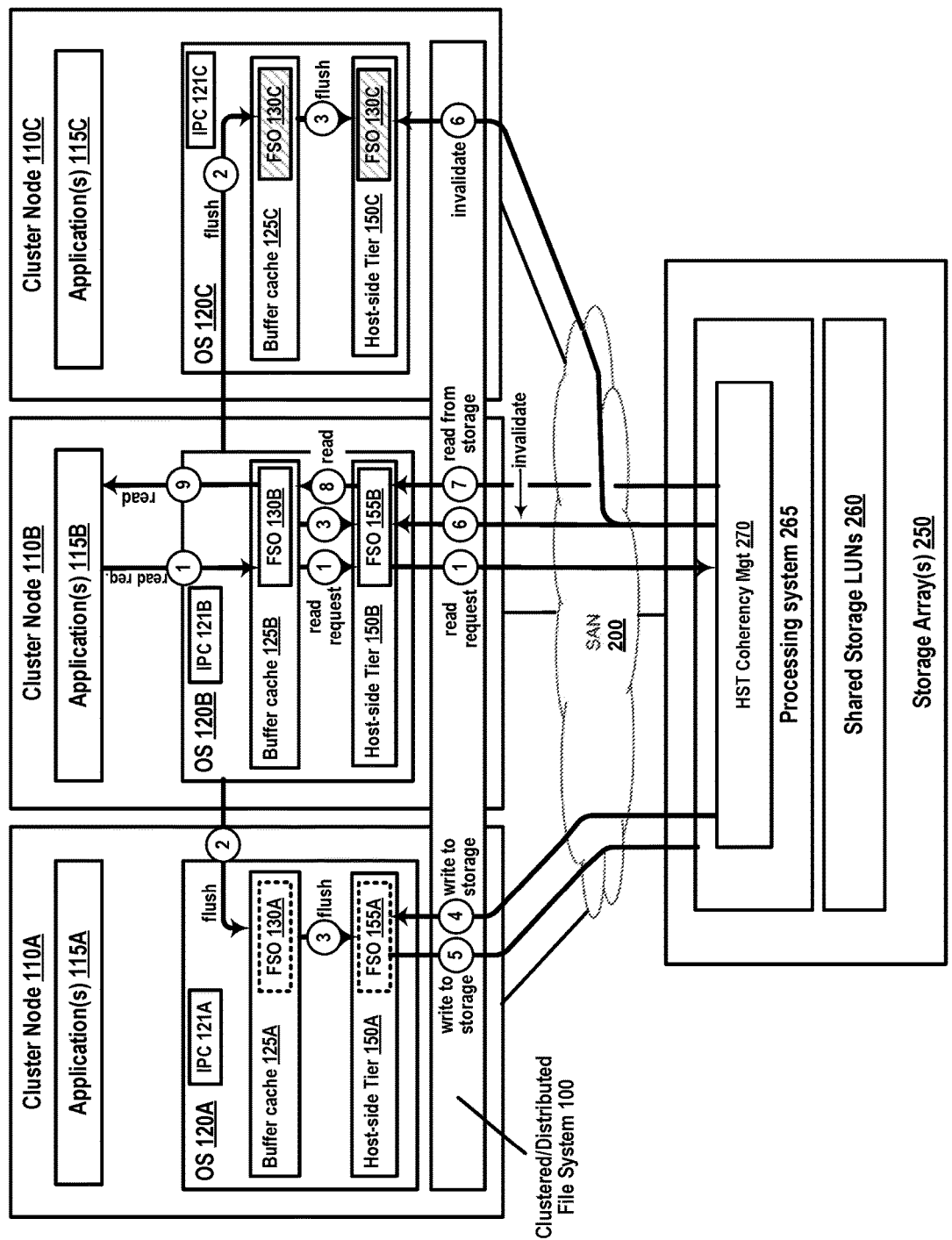

FIGS. 3A and 3B illustrate, in block diagram form, components and functionality of a clustered/distributed file system (C/DFS) 100 wherein each node in the C/DFS 100 has a file system buffer cache 125 and a host-side cache 150 with host-side cache coherency managed by a storage device 250, in accordance with some embodiments. Method 600, described below with reference to FIG. 6, describes a method having the cache coherency logic described below, with reference to FIGS. 3A and 3B.

In this embodiment, the storage array 250 contains host-side cache coherency logic 270 that manages host-side cache coherency. HST coherency mgt. 270 in storage array 250 can be implemented by hardware and/or software of processing system 265 of storage array 250. Processing system 265 can include one or more hardware processors, memory, high-speed buses, an operating system, and other processing elements to implement storage array 250 management, including HST Coherency Mgt. 270. Exemplary hardware is described below with reference to FIG. 8. In this embodiment, file system objects (FSO) are moved between the storage array 250 and the host-side caches 150, similar to any other storage tier. When the storage array 250 decides that it would be beneficial to place a file system object on a specific node's 110 host-side cache 125, it will do so. The storage array 250 can also decide to move an FSO from a node 110 back to the storage array 250, or to another node 110. When the file system of a node 110 issues a write, it proceeds as normal for the clustered/distributed file system 100. Eventually, the write will be flushed from the file system buffer cache 125 and stored in the local host-side cache 150. When a read occurs, the node 110 originating the read will signal to its peer nodes 110 to flush their buffer caches 125, again as normal for the file system of a node 110. When a buffer cache 125 FSO is flushed to the host-side cache 150, the host-side cache 150 and the storage array 250 can determine if that FSO should be flushed all the way to the storage array 250. This happens, for example, when a read occurs at one node 110 while a peer node 110 has yet to flush the latest version of the file system object to the storage array 250 from its host-side cache 150. Once the FSO has been flushed all the way to the storage array 250, the requesting node 110 can continue with the read.

Cluster nodes 110A-110C and application(s) 115A-115C, buffer cache 125A-125C, and host-side cache 150A-150C have been described above with reference to FIGS. 1A and 1B. For brevity, these elements will not be described again here.

In the embodiment described with reference to FIGS. 3A and 3B, operating systems (OS) 120A-120C can include cache coherency logic that manages the buffer cache 125. In an embodiment, cache coherency logic of OS 120A-120C can communicate with both the file system buffer cache 125 and the host-side buffer cache 150 of each node 110 of the C/DFS 100. Storage array 250 further includes a host-side coherency management 270 logic that can determine when to move a file system object (FSO) to, or from, the storage array 250. Communication of cache coherency messages between OS 120A-120C can be shared internally on each node 110 to implement cache coherency for both file system buffer cache 125 and host-side cache 150 for cluster nodes 110A-110C. Communication of cache coherency logic between storage array HST coherency mgt. 270 and cache coherency logic in OS 120A-120C can cross storage area network (SAN) 200.

Operation of cache coherency for buffer cache 125 and host-side cache 150 is shown by way of example in FIGS. 3A and 3B. Beginning with FIG. 3A, the example includes writing (1) of a file system object (FSO) 130A by application 115A. Multiple copies of the FSO 130 can exist within the C/DFS 100. For example, a read or write operation at node 110B can cause a copy of FSO 130B to exist in buffer cache 125B and/or a copy of FSO 155B to exist in host-side cache 150B. Similarly, a copy of FSO 130C and/or FSO 155C can exist in node 110C buffer cache 125B and/or host-side cache 150C, respectively.

In response to the write (1) by application 115A, cache coherency logic in OS 120A can cause buffer cache 125A to send (2) an "invalidate copy of FSO 130" message to nodes 110B and 110C. Cache coherency logic in OS 120B can invalidate the copy of FSO 130 (FSO 130B) in cache 125B. Cache coherency logic in OS 120C can similarly invalidate the copy of FSO 130 (FSO 130C) in cache 125C. Invalidated copies of FSO 130B and 130C are shown with hashed lines in FIG. 3A. Cluster node 110B host-side cache 150B may already have a copy of FSO 130, stored as host-side cache FSO 155B. Cluster node 110C host-side cache 150C may already have a copy of FSO 130, stored as host-side cache FSO 155C.

Continuing to FIG. 3B, a C/DFS 100 node, e.g. cluster node 110B, can generate a request (1) for a copy of FSO 130, such as from application 115B. In response to the read (1) request at OS 120B, cache coherency logic in OS 120B can (2) send a "flush FSO 130" message each of nodes 110A and 110C. Nodes 110A-110C can each (3) flush their respective copy of FSO 130 from their file buffer caches 125A-125C to their respective host-side caches 150A-150C. HST Coherency Mgt. 270 in storage array 250 can monitor host-side caches 150A-150C to determine when a host-side cache 150 read or write operation has been performed. Thus, HOST Coherency Mgt. 270 can determine which of FSO 155A-155C is the most recent copy of the FSO 130 stored in a host-side cache 150 of a cluster node 110 of C/DFS 100. Based on the determination that FSO 155A is the most recent copy of the FSO 130, HST Coherency Mgt. 270 can (4) instruct host-side cache 150A to write FSO 155A to storage array 250. Host cache 150A then (5) writes the FSO 155A to storage array 250 as instructed by HST Coherency Mgt. 270 of storage array 250. Since coherency of host-side caches 150A-150C is managed by HST Coherency Mgt. 270 in storage array 250, storage array 250 need not send a write acknowledgement to host-side cache 150A that FSO 155A was successfully written. Instead, when HST Coherency Mgt. 270 determines that the write of FSO 155A to storage array 250 is complete, HST Coherency Mgt. 270 can send (6) a "invalidate FSO 155" message to host-side cache 150B and 150C. In an embodiment, HST Coherency Mgt. 270 need not send (6) an "invalidate FSO 155" message to host-side cache 150A, because HST Coherency Mgt. 270 knows that FSO 155A is the most recent copy of FSO 155 as between the host-side caches 150A-150C. HST Coherency Mgt. 270 can send an instruction to node 110B to (7) read the most recent copy of FSO 130 from storage array 250 and store the FSO into host-side cache 150B. Coherency logic on OS 120B can detect the write of FSO 130 to host-side cache 155B, and then (8) read FSO 155B from host-side cache 150B and store the FSO in buffer cache 125B as FSO 130B. OS 120B can then provide (9) the FSO 130B to requesting application 115B in response to the initial read request (1) by application 115B. In addition, the storage array 250 can periodically initiate a "flush" message to the host-side cache 150A-150C independent from a read or write request from, e.g., an application 115. This may occur, for example, during periods of low activity in order to avoid having to flush synchronously during the read request.

Figure 4:
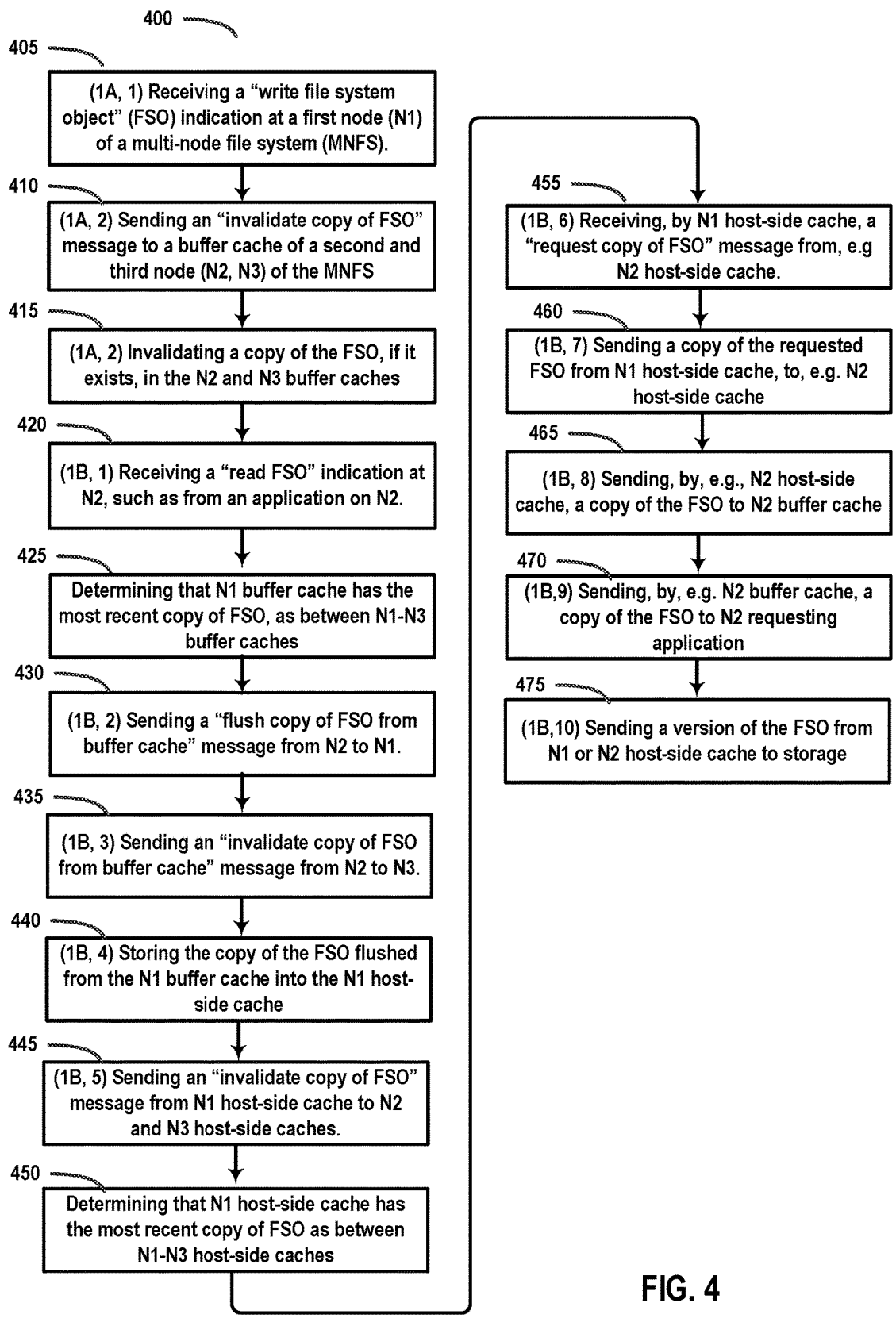
FIG. 4 illustrates, in block diagram form, a method of file system buffer cache and host-side cache coherency management in a clustered/distributed file system (C/DFS), managed by a host-side tier cache coherency logic, in accordance with some embodiments.

FIG. 4 illustrates, in block diagram form, a method 400 of file system buffer cache and host-side cache coherency management in a clustered/distributed file system (C/DFS), managed by a host-side tier cache coherency logic, in accordance with some embodiments. Structure and logic for implementing method 400 is described above with reference to FIGS. 1A and 1B.

In operation 405, a first node (N1) in a multi-node file system (MNFS) can receive a "write file system object (FSO)," instruction to write a most recent copy of an FSO, such as FSO 130 of FIG. 1A. The write operation may result in the FSO being written to one or more caches, as distinguished from writing directly to a storage device.

In operation 410, cache coherency logic in, e.g. an operating system 120, can send an "invalidate copy of FSO" message an operating system of each of a second node (N2) and a third node (N3) to copies of the FSO in the buffer cache 125 of each of N2 and N3.

In operation 415, node N2 can invalidate a copy of the FSO in its buffer cache, if such a copy of the FSO exists. Similarly, N3 can invalidate a copy of the FSO in its buffer cache, if such as a copy of the FSO exists.

In operation 420, either of N2 or N3 (in this example, N2) can receive a "read FSO" request to read a most recent copy of the FSO. The read request asks for the most recent copy of the FSO, and, in an embodiment, the read request does not need to specify a source node, cache, or storage from where the copy of the FSO is read.

In operation 425, nodes N1-N3 can use inter-node communication to determine which of nodes N1-N3 has a most recent copy of the FSO in a buffer cache. In the example of method 400, node N1 buffer cache has the most recent copy of the FSO, due to the "write FSO" instruction received at node N1 in operation 405, above.

In operation 430, buffer cache coherency logic in OS 120 can send a message from N2 to N1 for N1 to flush buffer cache copy of the FSO. In this embodiment of FIGS. 1A, 1B, and method 400, buffer cache coherency logic in OS 120 need not be aware that N1 flushing its copy of the FSO results in flushing the copy of the FSO to a host-side cache of N1.

In operation 435, buffer cache coherency logic of N2 can send an "invalidate copy of FSO" to buffer cache coherency logic of node N3. In an embodiment, buffer cache coherency logic of N2 can invalidate N2 buffer cache copy of the FSO, since it was been determined that the most recent copy of the FSO is in N1 buffer cache, in operation 425, above.

In operation 440, buffer cache N1 can flush its copy of FSO to host-side cache of node N1. In an embodiment, N1 buffer cache coherency logic issues a generic "flush" command on its buffer cache, and host-side tier coherency logic for N1 can intercept the flush command to cause the N1 buffer cache copy of the FSO to be flushed to the N1 host-side cache.

In operation 445, host-side cache coherency logic for N1 can send an "invalidate host-side cache copy of FSO" message just to nodes N2 and N3, since N1 host-side cache has the most recent host-side cache copy of the FSO, as between nodes N1-N3.

In operation 450, it can be determined that N1 host-side cache has the most recent copy of the FSO as between the host-side caches of nodes N1-N3.

In operation 455, N1 host side cache can receive a "request for copy of FSO" message from N2 host-side cache coherency logic.

In operation 460, N1 host-side cache coherency logic can send the most recent copy of the FSO to N2 host-side cache.

In operation 465, node N2 host-side coherency logic can send the most recent copy of FSO, stored in N2 host-side cache, to N2's file buffer cache.

In operation 470, node N2 file buffer cache can provide its copy of the FSO to, e.g., requesting Application(s) 115B to satisfy the request for the most recent copy of the FSO from operation 405, above.

In operations 475, node N1 or N2 host-side cache can send its version of the FSO to storage array.

Figure 5:
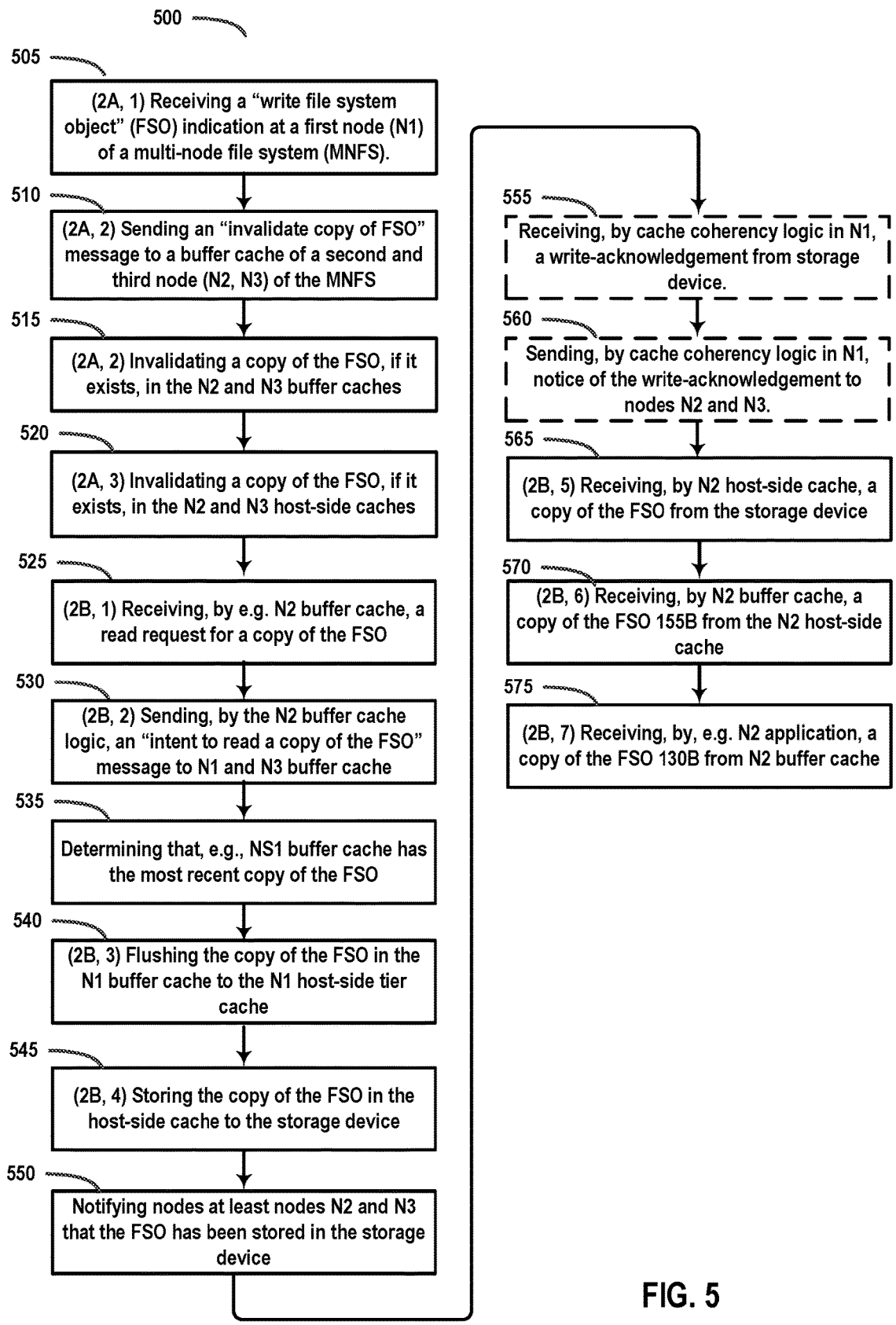
FIG. 5 illustrates, in block diagram form, a method of file system buffer cache and host-side cache coherency management in a clustered/distributed file system (C/DFS), managed by a file system cache coherency logic, in accordance with some embodiments.

FIG. 5 illustrates, in block diagram form, a method 500 of file system buffer cache and host-side cache coherency management in a clustered/distributed file system (C/DFS), managed by a file system cache coherency logic, in accordance with some embodiments. Structure and logic for implementing method 500 is described above with reference to FIGS. 2A and 2B.

In operation 505, a first node (N1) in a multi-node file system (MNFS) can receive a "write file system object (FSO)," instruction to write a most recent copy of an FSO, such as FSO 130 of FIG. 2A. The write operation may result in the FSO being written to one or more caches, as distinguished from writing directly to a storage device.

In operation 510, cache coherency logic in, e.g. an operating system 120, can send an "invalidate copy of FSO" message to an operating system of each of a second node (N2) and a third node (N3) to invalidate copies of the FSO in the buffer cache 125 of each of N2 and N3.

In operation 515, node N2 can invalidate a copy of the FSO in its buffer cache, if such a copy of the FSO exists. Similarly, N3 can invalidate a copy of the FSO in its buffer cache, if such as a copy of the FSO exists.

In operation 520, node N2 can invalidate a copy of the FSO in its host-side buffer cache, if such as copy of the FSO exists. Similarly, N3 can invalidate a copy of the FSO in its host-side cache, if such a copy of the FSO exists.

In operation 525, either of N2 or N3 (in this example, N2) can receive a "read FSO" request to read a most recent copy of the FSO. The read request asks for the most recent copy of the FSO, and, in an embodiment, the read request does not need to specify a source node, cache, or storage from where the copy of the FSO is read.

In operation 530, node N2 buffer cache coherency logic can send an "intent to read a most recent copy of FSO" message to N1 and N3 buffer caches.

In operation 535, it can be determined that, in this example, node N1 buffer cache has the most recent copy of the FSO, and that node N3 copy of the FSO has been invalidated in operation 515, above.

In operation 540, since the copy of the FSO in the N1 buffer cache is the most recent copy of the FSO, cache coherency logic in the operating system of node N1 can cause N1 buffer cache to flush the FSO to the N1 host-side cache.

In operation 545, cache coherency logic in N1 can flush the copy of the FSO stored in the host-side cache of N1 to the storage device, e.g. a storage array.

In operation 550, cache coherency logic in N1 can notify nodes N2 and N3 that the most recent copy of the FSO has been flushed to the storage array.

In operation 555, cache coherency logic of N1 can optionally receive a write-acknowledgement from the storage device, e.g. storage array that the FSO write to storage is complete.

In operation 560, cache coherency logic of N1 can optionally send the write-acknowledgement to nodes N2 and N3 that the FSO has been written to storage and is available for reading.

In operation 565, cache coherency logic in N2 can cause host-side cache of N2 to read the FSO from storage.

In operation 570, cache coherency logic in N2 can cause the file buffer cache of N2 to read the FSO from host-side cache of N2.

In operation 575, cache coherency logic in N2 can provide the FSO to the requesting application of N2.

Figure 6:
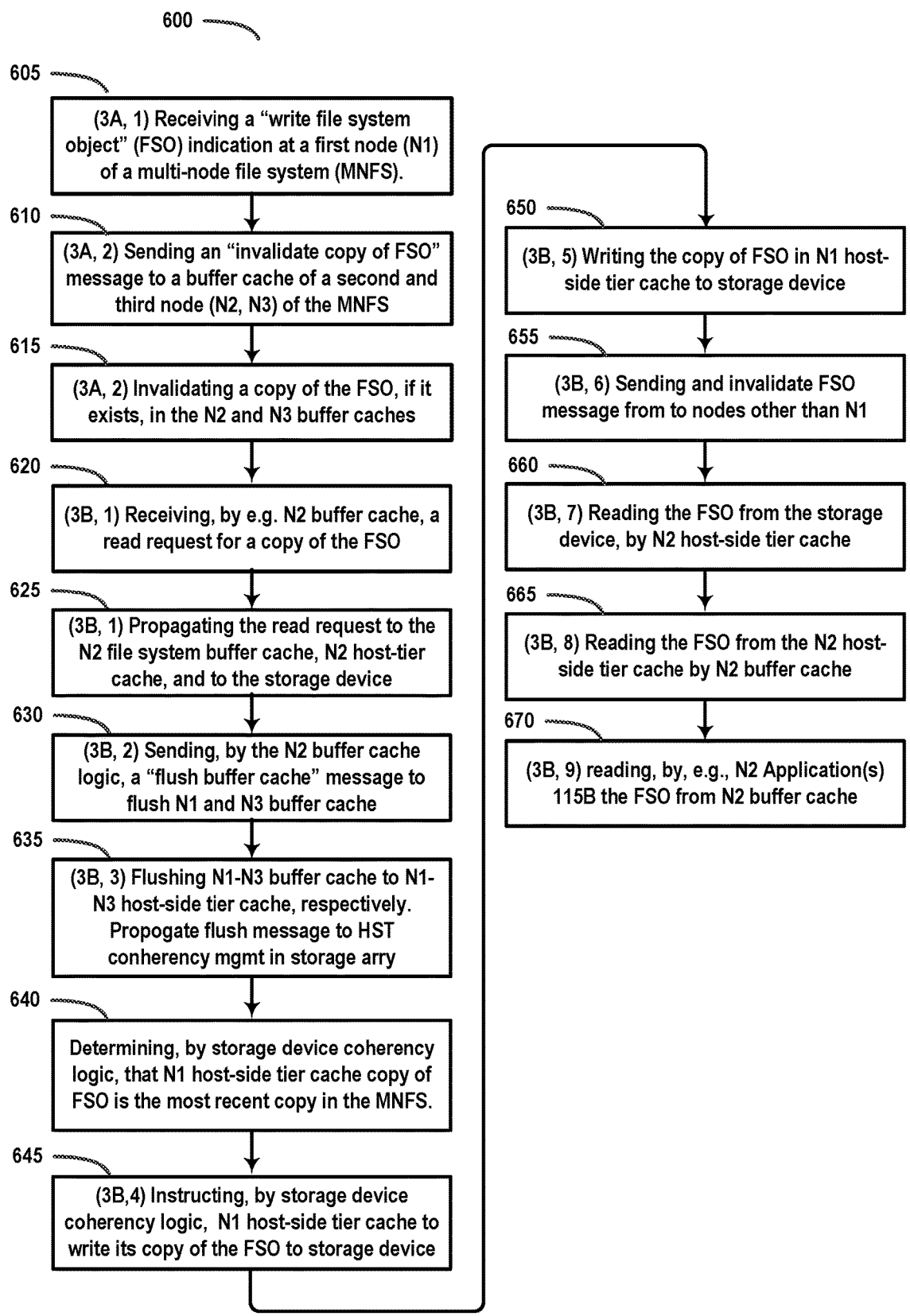
FIG. 6 illustrates, in block diagram form, a method of file system buffer cache and host-side cache coherency management in a clustered/distributed file system (C/DFS), managed by a cache coherency logic in a storage device processing system, in accordance with some embodiments.

FIG. 6 illustrates, in block diagram form, a method 600 of file system buffer cache and host-side cache coherency management in a clustered/distributed file system (C/DFS), managed by a storage device processing system, in accordance with some embodiments.

In operation 605, a first node (N1) in a multi-node file system (MNFS) can receive a "write file system object (FSO)," instruction to write a most recent copy of an FSO, such as FSO 130 of FIG. 3A. The write operation may result in the FSO being written to one or more caches, as distinguished from writing directly to a storage device, such as storage array 250.

In operation 610, cache coherency logic in, e.g. an operating system 120, can send an "invalidate copy of FSO" message to an operating system 120 of each of a second node (N2) and a third node (N3) to invalide copies of the FSO in the buffer cache 125 of each of N2 and N3.

In operation 615, node N2 can invalidate a copy of the FSO in its buffer cache 125, if such a copy of the FSO exists. Similarly, N3 can invalidate a copy of the FSO in its buffer cache 125, if such as a copy of the FSO exists.

In operation 620, either of N2 or N3 (in this example, N2) can receive a "read FSO" request to read a most recent copy of the FSO. The read request asks for the most recent copy of the FSO, and, in an embodiment, the read request does not need to specify a source node, cache, or storage from where the copy of the FSO is read.

In operation 625, the read request (1) can be propagated to HST Coherency Mgt. 270 on storage device 250. In an embodiment, the read request can be propagated by OS 120 directly to HST Coherency Mgt. 270 on storage array 270, or can be relayed to host-side cache 150 to HST Coherency Mgt. 270 on storage array 270.

In operation 630, OS 120 cache coherency logic of N1 can send a "flush FSO 130" message to flush their respective buffer caches.

In operation 635, nodes N2 and N3 can flush FSO 130 from buffer caches of N2 and N3 to their respective host-tier caches. Coherency logic of N1 can further flush its own copy of FSO 130 from the N1 buffer cache to the N1 host-tier cache.

In operation 640, HST Coherency Mgt. 270 on storage device 250 can determine that the copy of the FSO stored in N1 host-side cache 150 is the most recent copy of the FSO.

In operation 645, HST Coherency Mgt. 270 can instruct N1 host-side cache to write its FSO to the storage device, e.g. storage array 250.

In operation 650, N1 host-side cache can write its copy of the FSO to storage device 250. Since HST Coherency Mgt. 270 forms a part of the storage device 250, storage device 250 need not send a write-acknowledgement to N1 host-side cache. In an embodiment, HST Coherency Mgt. 270 can receive notice of, or detect, completion of the write of the FSO to storage device 250.

In operation 655, HST Coherency Mgt. 270 of storage array 250 can send an "invalidate FSO 130" instruction to the host-side cache 150 of nodes N2 and N3. N1 host-side cache need not be invalidated because it contained the most recent copy of the FSO in operation 635, above.

In operation 660, HST Coherency Mgt. 270 of storage array 250 can instruct N2 host-side cache 150 to read the FSO from the storage device 250.

In operation 665, N2 buffer cache 125 can read the FSO from N2 host-side cache 150.

In operation 670, N2 buffer cache can provide the FSO to the requesting N2 Application to fulfill the initial read request of operation 620, above.

Figure 7:
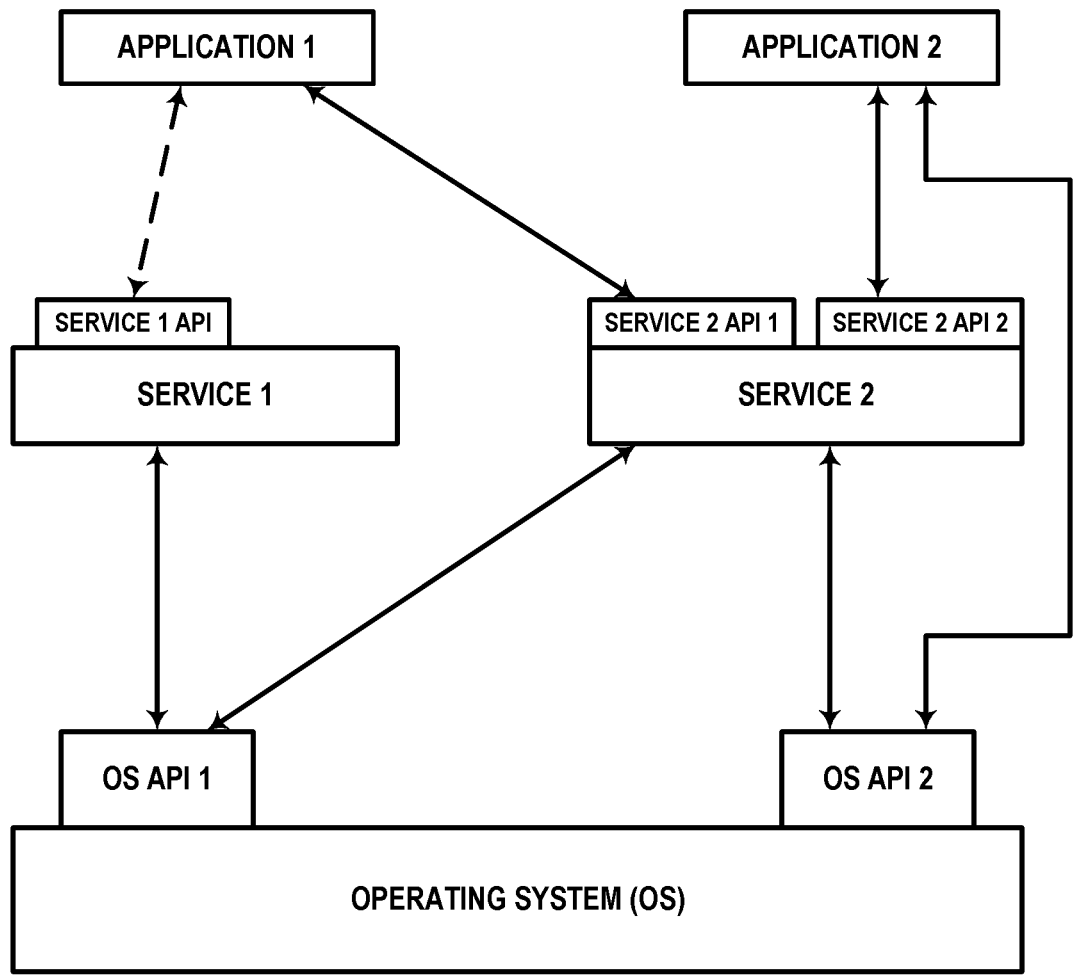
FIG. 7 illustrates an exemplary embodiment of a software stack usable in some embodiments of the invention.

In FIG. 7 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
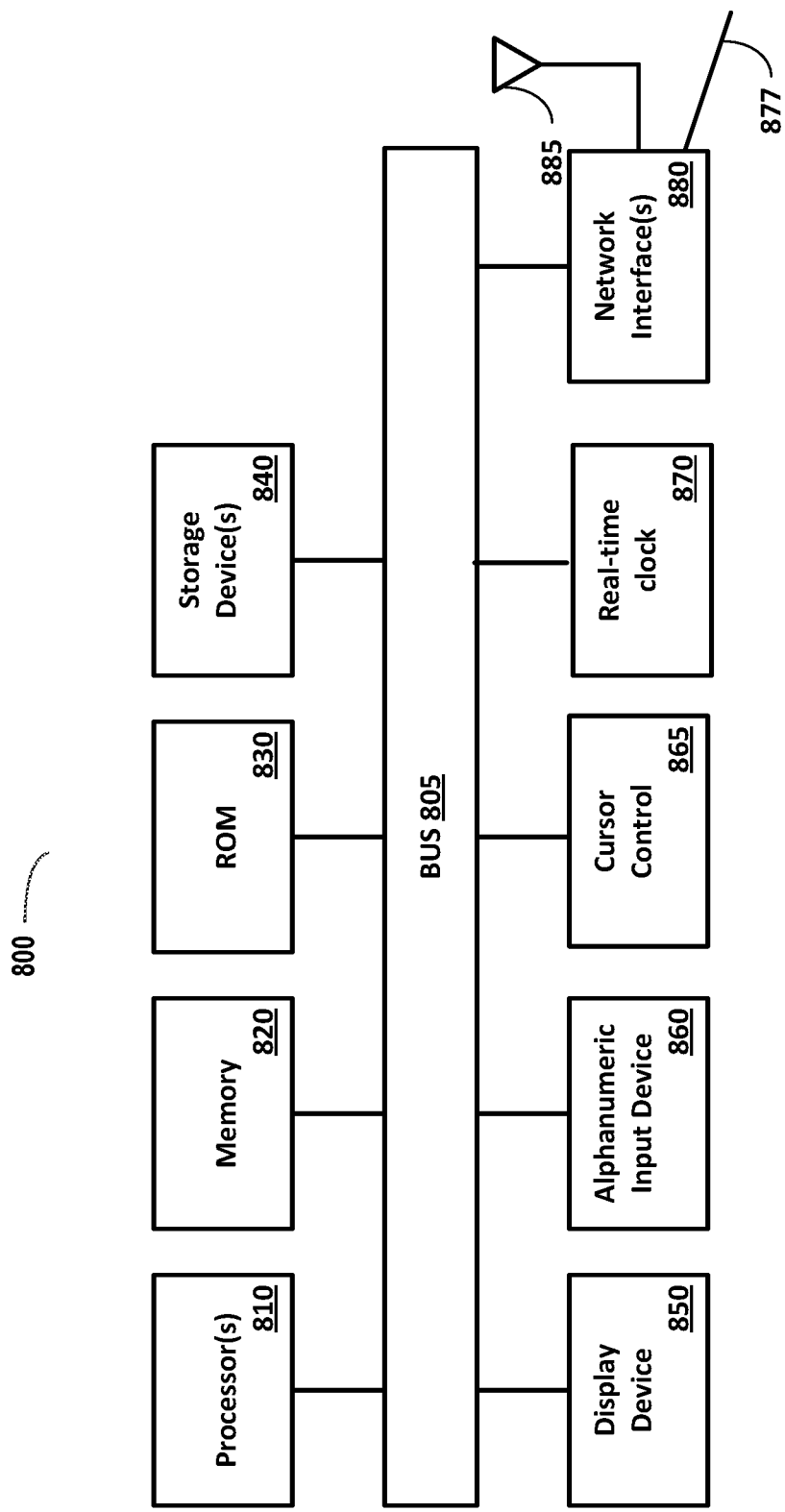
FIG. 8 illustrates, in block diagram form, an exemplary computing system for implementing concepts described herein.

FIG. 8 is a block diagram of one embodiment of a computing system 800. The computing system illustrated in FIG. 8 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 8 may be used to provide a computing device and/or a server device.

Computing system 800 includes bus 805 or other communication device to communicate information, and processor 810 coupled to bus 805 that may process information.

While computing system 800 is illustrated with a single processor, computing system 800 may include multiple processors and/or co-processors 810. Computing system 800 further may include random access memory (RAM) or other dynamic storage device 820 (referred to as main memory), coupled to bus 805 and may store information and instructions that may be executed by processor(s) 810. Main memory 820 may also be used to store temporary variables or other intermediate information during execution of instructions by processor 810.

Computing system 800 may also include read only memory (ROM) 830 and/or other static, non-transitory storage device 840 coupled to bus 805 that may store static information and instructions for processor(s) 810. Data storage device 840 may be coupled to bus 805 to store information and instructions. Data storage device 840 such as flash memory or a magnetic disk or optical disc and corresponding drive may be coupled to computing system 800.

Computing system 800 may also be coupled via bus 805 to display device 850, such as a light-emitting diode display (LED), touch screen display, or liquid crystal display (LCD), to display information to a user. Computing system 800 can also include an alphanumeric input device 860, including alphanumeric and other keys, which may be coupled to bus 805 to communicate information and command selections to processor(s) 810. Another type of user input device is cursor control 865, such as a touchpad, a mouse, a trackball, or cursor direction keys to communicate direction information and command selections to processor(s) 810 and to control cursor movement on display 850. Computing system 800 may further include a real-time clock 870. The real-time clock 870 may be used for generating date/time stamps for data records, computing elapsed time, and other time-keeping functions. A real-time clock 870 can be a battery-backed chipset with a settable date and time. Alternatively, a real-time clock 870 may include logic to retrieve a real-time from a network source such as a server or an Internet server via network interfaces 880, described below.

Computing system 800 further may include one or more network interface(s) 880 to provide access to a network, such as a local area network. Network interface(s) 880 may include, for example, a wireless network interface having antenna 885, which may represent one or more antenna(e). Computing system 800 can include multiple wireless network interfaces such as a combination of WiFi, Bluetooth® and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method of managing cache coherency in a multi-node file system, each node having a file system buffer cache with cache coherency managed by an operating system of the node and a host-side cache with cache coherency managed by a storage device that is coupled to the nodes in the multi-node file system, the method comprising:
   receiving, by the storage device, an indication of a read request for a copy of a file system object (FSO) at a second node of the multi-node file system, the read request received from an application at a file system buffer cache of the second node and propagated to a host-side cache of the second node;
   receiving, by the storage device, an indication that a host-side cache of a first node within the multi-node file system contains a most recent copy of the FSO within a plurality of nodes of the multi-node file system;
   instructing, by the storage device, the host-side cache of the first node to write the FSO to the storage device; and
   receiving, by the storage device, the FSO and storing the FSO in the storage device,
   wherein, for each node in the multi-node file system, the file system buffer cache is implemented in volatile random access memory (RAM), the host-side cache is implemented in high-speed non-volatile RAM, and the host-side cache is distinct from the file system buffer cache.

2. The method of claim 1, wherein the coherency of a host-side cache of each node in the multi-node file system is managed by the storage device, including the storage device monitoring the host-side cache of each node in the multi-node file system, to determine whether a host-side cache read or write operation has been performed, wherein the storage device comprises a storage appliance.

3. The method of claim 1, further comprising:
   sending, by the storage device, an invalidate FSO message to the plurality of nodes of the multi-node file system, other than the first node, wherein the invalidate FSO message instructs each of the plurality of nodes, other than the first node, to invalidate a copy of the FSO held in the host-side cache of the node, if a copy of the FSO is present in the host-side cache.

4. The method of claim 1, further comprising:
   sending, by the storage device, the copy of the FSO received from the host-side cache of the first node, to the host-side cache of the second node.

5. The method of claim 4, further comprising:
   in response to the storage device receiving a read request for the FSO from a third node, before receiving an indication of invalidation of the FSO:
   instructing the host-side cache of the first node or the second node to move a copy of the FSO to the host-side cache of the third node.

6. A non-transitory computer-readable medium programmed with executable instructions that, when executed by a processing system having at least one hardware processor, perform operations for managing cache coherency in a multi-node file system, each node having a file system buffer cache with cache coherency managed by an operating system of the node and a host-side cache with cache coherency managed by a storage device that is coupled to the nodes in the multi-node file system, the operations comprising:
   receiving, by the storage device, an indication of a read request for a copy of a file system object (FSO) at the second node of a multi-node file system, the read request received from an application at a file system buffer cache of the second node and propagated to a host-side cache of the second node;
   receiving, by the storage device, an indication that a host-side cache of a first node within the multi-node file system contains a most recent copy of the FSO within a plurality of nodes of the multi-node file system;
   instructing, by the storage device, the host-side cache of the first node to write the FSO to the storage device; and
   receiving, by the storage device, the FSO and storing the FSO in the storage device,
   wherein, for each node in the multi-node file system, the file system buffer cache is implemented in volatile random access memory (RAM), the host-side cache is implemented in high-speed non-volatile RAM, and the host-side cache is distinct from the file system buffer cache.

7. The medium of claim 6, wherein the coherency of a host-side cache of each node in the multi-node file system is managed by the storage device, including the storage device monitoring the host-side cache of each node in the multi-node file system, to determine whether a host-side cache read or write operation has been performed, wherein the storage device comprises a storage appliance.

8. The medium of claim 6, the operations further comprising:
   sending, by the storage device, an invalidate FSO message to the plurality of nodes of the multi-node file system, other than the first node, wherein the invalidate FSO message instructs each of the plurality of nodes, other than the first node, to invalidate a copy of the FSO held in the host-side cache of the node, if a copy of the FSO is present in the host-side cache.

9. The medium of claim 6, the operations further comprising:
   sending, by the storage device, the copy of the FSO received from the host-side cache of the first node, to the host-side cache of the second node.

10. The medium of claim 9, the operations further comprising:
    in response to the storage device receiving a read request for the FSO from a third node, before receiving an indication of invalidation of the FSO:
    instructing the host-side cache of the first node or the second node to move a copy of the FSO to the host-side cache of the third node.

11. A system comprising:
    a processing system having at least one hardware processor, the processing system coupled to a memory programmed with executable instructions that, when executed by the processing system, perform operations for managing cache coherency in a multi-node file system, each node having a file system buffer cache with cache coherency managed by an operating system of the node and a host-side cache with cache coherency managed by a storage device that is coupled to the nodes in the multi-node file system, the operations comprising:
    receiving, by the storage device, an indication of a read request for a copy of a file system object (FSO) at the second node of a multi-node file system, the read request received from an application at a file system buffer cache of the second node and propagated to a host-side cache of the second node;

receiving, by the storage device, an indication that a host-side cache of a first node within the multi-node file system contains a most recent copy of the FSO within a plurality of nodes of the multi-node file system;

instructing, by the storage device, the host-side cache of the first node to write the FSO to the storage device; and receiving, by the storage device, the FSO and storing the FSO in the storage device, wherein, for each node in the multi-node file system, the file system buffer cache is implemented in volatile random access memory (RAM), the host-side cache is implemented in high-speed non-volatile RAM, and the host-side cache is distinct from the file system buffer cache.

12. The system of claim 11, wherein the coherency of a host-side cache of each node in the multi-node file system is managed by the storage device, including the storage device monitoring the host-side cache of each node in the multi-node file system, to determine whether a host-side cache read or write operation has been performed, wherein the storage device comprises a storage appliance.

13. The system of claim 11, the operations further comprising:

sending, by the storage device, an invalidate FSO message to the plurality of nodes of the multi-node file system, other than the first node, wherein the invalidate FSO message instructs each of the plurality of nodes, other than the first node, to invalidate a copy of the FSO held in the host-side cache of the node, if a copy of the FSO is present in the host-side cache.

14. The system of claim 11, the operations further comprising:

sending, by the storage device, the copy of the FSO received from the host-side cache of the first node, to the host-side cache of the second node.

15. The system of claim 14, the operations further comprising:

in response to the storage device receiving a read request for the FSO from a third node, before receiving an indication of invalidation of the FSO:

instructing the host-side cache of the first node or the second node to move a copy of the FSO to the host-side cache of the third node.

* * * * *